(12) United States Patent
Tang

(10) Patent No.: US 11,730,580 B1
(45) Date of Patent: Aug. 22, 2023

(54) DUAL-PURPOSE ELECTRIC TOOTHBRUSH HEAD

(71) Applicant: Guangdong Yingxin Technology Co., Ltd., Dongguan (CN)

(72) Inventor: Guoming Tang, Gaozhou (CN)

(73) Assignee: GUANGDONG YINGXIN TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/083,500

(22) Filed: Dec. 17, 2022

(51) Int. Cl.
*A61C 17/36* (2006.01)
*A61C 17/22* (2006.01)

(52) U.S. Cl.
CPC ............ *A61C 17/36* (2013.01); *A61C 17/222* (2013.01)

(58) Field of Classification Search
CPC ..... A61C 17/36; A61C 17/222; A61C 17/225; A61C 17/34; A61C 17/227
See application file for complete search history.

(56) References Cited

FOREIGN PATENT DOCUMENTS

| CN | 112891005 A | * | 6/2021 |
| CN | 115153937 A | * | 10/2022 |

* cited by examiner

*Primary Examiner* — Shay Karls
(74) *Attorney, Agent, or Firm* — Zhigang Ma

(57) ABSTRACT

A dual-purpose electric toothbrush head is provided and includes a toothbrush handle and a toothbrush head. The toothbrush head includes toothbrush bristles, and a nozzle and a water trough are disposed in the toothbrush head. The nozzle is connected to the water trough, and the toothbrush handle has a water inlet chamber. A water inlet hole is provided between the water inlet chamber and the water trough. A tail plug is provided on a toothbrush head tail end. The dual-purpose electric toothbrush head can not only clean teeth, but also rinse diastema and oral cavity to ensure oral hygiene. The dual-purpose electric toothbrush has diverse functions, and is stable and convenient to use, safe and reliable.

19 Claims, 4 Drawing Sheets

DUAL-PURPOSE ELECTRIC TOOTHBRUSH HEAD

TECHNICAL FIELD

The disclosure relates to a field of electric toothbrush technologies, and more particularly to a dual-purpose electric toothbrush head.

BACKGROUND

Electric toothbrushes are widely used because of their high efficiency, portability and good cleaning effect. Most of the electric toothbrushes in current market drive the toothbrush head to vibrate through rapid rotation of the motor, which ensures the good cleaning effect. However, internal structures of the current electric toothbrushes are complex, too many assembly parts bring corresponding costs to production and processing, and a destruction rate of the whole electric toothbrush is high. In addition, the rapid rotation of the motor drives the toothbrush head to vibrate through a transmission assembly, therefore, unstable internal structure may cause damage to the internal structure, which affects a normal use of the electric toothbrush.

Electric toothbrushes are used to clean tooth surface efficiently, but they cannot rinse a diastema (also referred to as a gap or vacant space between two teeth) and oral cavity, so they cannot achieve complete cleaning for dental hygiene and cannot make oral hygiene be fully protected. Therefore, consumers want to have an electric toothbrush that can clean the tooth surface as well as rinse the diastema and the oral cavity.

SUMMARY

An object of the disclosure is to provide a dual-purpose electric toothbrush head that can not only clean the tooth surface, but also rinse the diastema and the oral cavity to ensure the oral hygiene. In addition, the dual-purpose electric toothbrush head has various functions, and is stable and convenient to use, safe and reliable.

In order to achieve the above objective, the disclosure provides the dual-purpose electric toothbrush head, including a toothbrush handle and a toothbrush head. The toothbrush head includes toothbrush bristles, and is provided with a nozzle and a water trough therein; the nozzle is connected to the water trough; the toothbrush handle includes a water inlet chamber; a water inlet hole is disposed between the water inlet chamber and the water trough; the toothbrush handle is provided with a toothbrush handle tail end thereon; and the toothbrush handle tail end is provided with a tail plug thereon.

In an embodiment of the disclosure, the toothbrush head is provided with a back cover disposed on the water trough.

In an embodiment of the disclosure, a shape of the back cover corresponds to a shape of the toothbrush head.

In an embodiment of the disclosure, a length of the water trough is 20 millimeters (mm), a width of the water trough is 3 mm, a height of the water trough is 1.5 mm, and an area of the water trough is 2 square millimeters ($mm^2$).

In an embodiment of the disclosure, the toothbrush bristles of the toothbrush head at least includes a first row of toothbrush bristles and a second row of toothbrush bristles; and the nozzle is disposed between the first row of toothbrush bristles and the second row of toothbrush bristles.

In an embodiment of the disclosure, a shape of the nozzle is cylindrical; a diameter of the nozzle is 2 mm; and a height of the nozzle is 6 mm protruding from the water trough.

In an embodiment of the disclosure, the nozzle and the toothbrush head are integrated into one whole by injection molding.

In an embodiment of the disclosure, the nozzle is provided with a water spray hole therein, and the nozzle is connected to the water trough.

In an embodiment of the disclosure, a shape of the tail plug is a hollow circular table shape, a bottom of the tail plug is provided with a fixing plate thereon, a bottom of the fixing plate is provided with a bottom hole; and a top of the tail plug is provided with a locating hole thereon.

In an embodiment of the disclosure, a bottom of the tail plug is provided with a lug boss, and a shape of the lug boss is a circular table shape.

In an embodiment of the disclosure, the tail plug is provided with at least one locating block, and each of the at least one locating block is correspondingly provided with a protruding block.

In an embodiment of the disclosure, a bottom of the tail plug is provided with at least one opening groove, and each of the at least one opening groove is correspondingly provided with a resilient piece thereon.

In an embodiment of the disclosure, a top of the tail plug is provided with a waterproof portion thereon.

Advantages of the disclosure are as follows. By arranging the water inlet chamber in the toothbrush handle, and the water trough and the nozzle in the toothbrush head, the disclosure uses a main engine to pump water, so that the water enters into the water trough through the water inlet chamber, and then is sprayed out from the nozzle through the water trough, which achieves rinsing the diastema and the oral cavity. In addition, the dual-purpose electric toothbrush head of the disclosure has a reasonable structure and various functions, which can not only clean the teeth but also rinse the diastema and the oral cavity, further ensuring the oral hygiene. Furthermore, the disclosure is practical, easy to use, safe, reliable and suitable for universal promotion and use.

BRIEF DESCRIPTION OF DRAWINGS

In order to explain embodiments of the disclosure or technical solutions in the related art more clearly, following descriptions will briefly introduce attached drawings in the embodiments or in descriptions of the related art. Apparently, the attached drawings in the following description are only some of embodiments of the disclosure. For those skilled in the art, other drawings can be obtained according to the structure shown in the attached drawings without paying creative labor.

Figure 1:
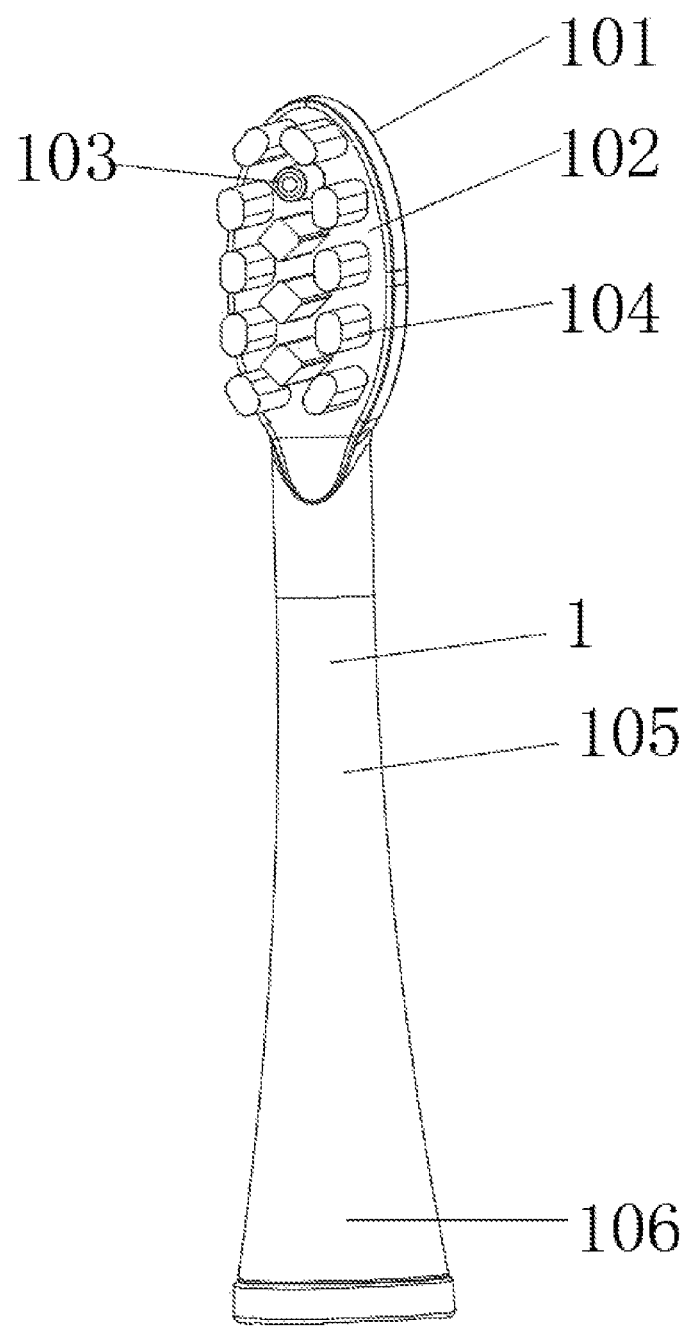
FIG. 1 is a schematic structural diagram of an electric toothbrush head according to an embodiment of the disclosure.

| Description of reference numerals: | |
|---|---|
| NO. | Name |
| 1 | electric toothbrush head body |
| 101 | toothbrush head |
| 102 | bristle planting surface |
| 103 | nozzle |
| 104 | bristle |
| 105 | toothbrush handle |
| 106 | toothbrush handle tail end |
| 107 | water spray hole |
| 108 | water trough |
| 109 | water inlet hole |
| 110 | water inlet chamber |
| 2 | tail plug |
| 201 | fixing plate |
| 202 | lug boss |
| 203 | opening groove |
| 204 | resilient piece |
| 205 | protruding block |
| 206 | locating block |
| 207 | waterproof portion |
| 208 | tail plug chamber body |
| 2081 | bottom hole |
| 2082 | locating hole |
| 3 | main engine |
| 301 | main engine axis |
| 302 | buckle slot |
| 303 | axis outlet hole |
| 4 | toothbrush head back |
| 41 | back cover |

Realization of the objective, functional features and advantages of the disclosure will be further described with a combination of the embodiments of the disclosure and the attached drawings of the disclosure.

DETAILED DESCRIPTION OF EMBODIMENTS

The technical solutions of the embodiments of the disclosure will be clearly and completely described below in combination with the attached drawings in the embodiments of the disclosure. Apparently, the described embodiments are only some embodiments of the disclosure and not all embodiments of the disclosure. Based on the embodiment of the disclosure, all other embodiments obtained by those skilled in the art without creative work belong to the protection scope of the disclosure.

It needs to explain that all directional indications (such as up, down, left, right, front, back . . . ) in the embodiments of the disclosure are only used to explain the relative position relations, motion conditions, etc. among the components in a particular attitude (as shown in the attached drawing), if the particular attitude changes, the directional indication changes accordingly.

In the disclosure, unless otherwise specified and limited, the terms "connected", "fixed", etc. shall be understood in a broad sense. For example, "fixed" may be a fixed connection, a detachable connection, or an integrated connection; it can be a mechanical connection or an electrical connection; it may be a direct connection or an indirect connection through an intermediate medium; it may be a connection between two elements or an interaction between two elements, unless otherwise specified. For those skilled in the art, the specific meaning of the above terms in the disclosure can be understood according to the specific circumstances.

In addition, if there is a description of "first", "second", etc., in the embodiments of the disclosure, the description of "first", "second", etc., is only used to describe purposes, cannot be understood as indicating or implying its relative importance or implicitly indicating the number of technical characteristics indicated. Thus, a feature defining "first" or "second" may include at least one of the features explicitly or implicitly. Additionally, the meaning of "and/or" in the full text, includes three parallel schemes, taking "A and/or B" as an example, including a scheme "A" or a scheme "B", or a scheme "A and B". In addition, the technical solutions between various embodiments may be combined with each other, but must be based on the achievement of those skilled in the art. When a combination of technical solutions appears contradictory or cannot be realized, the combination shall be considered not to exist and not to be within the protection scope of the disclosure.

The disclosure provides a dual-purpose electric toothbrush head.

Embodiment 1

Figure 2:
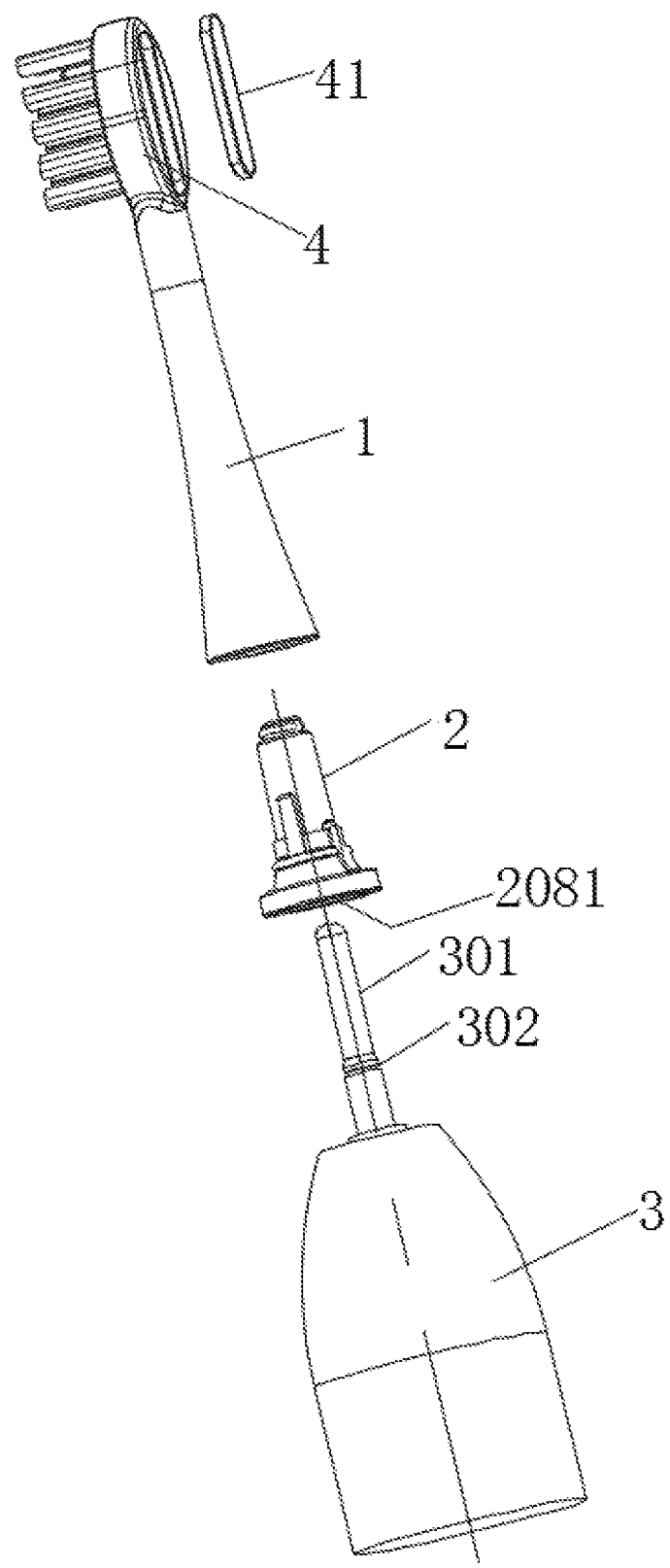
FIG. 2 is a schematic diagram of a disassembly of the electric toothbrush head according to the embodiment of the disclosure.
Figure 3:
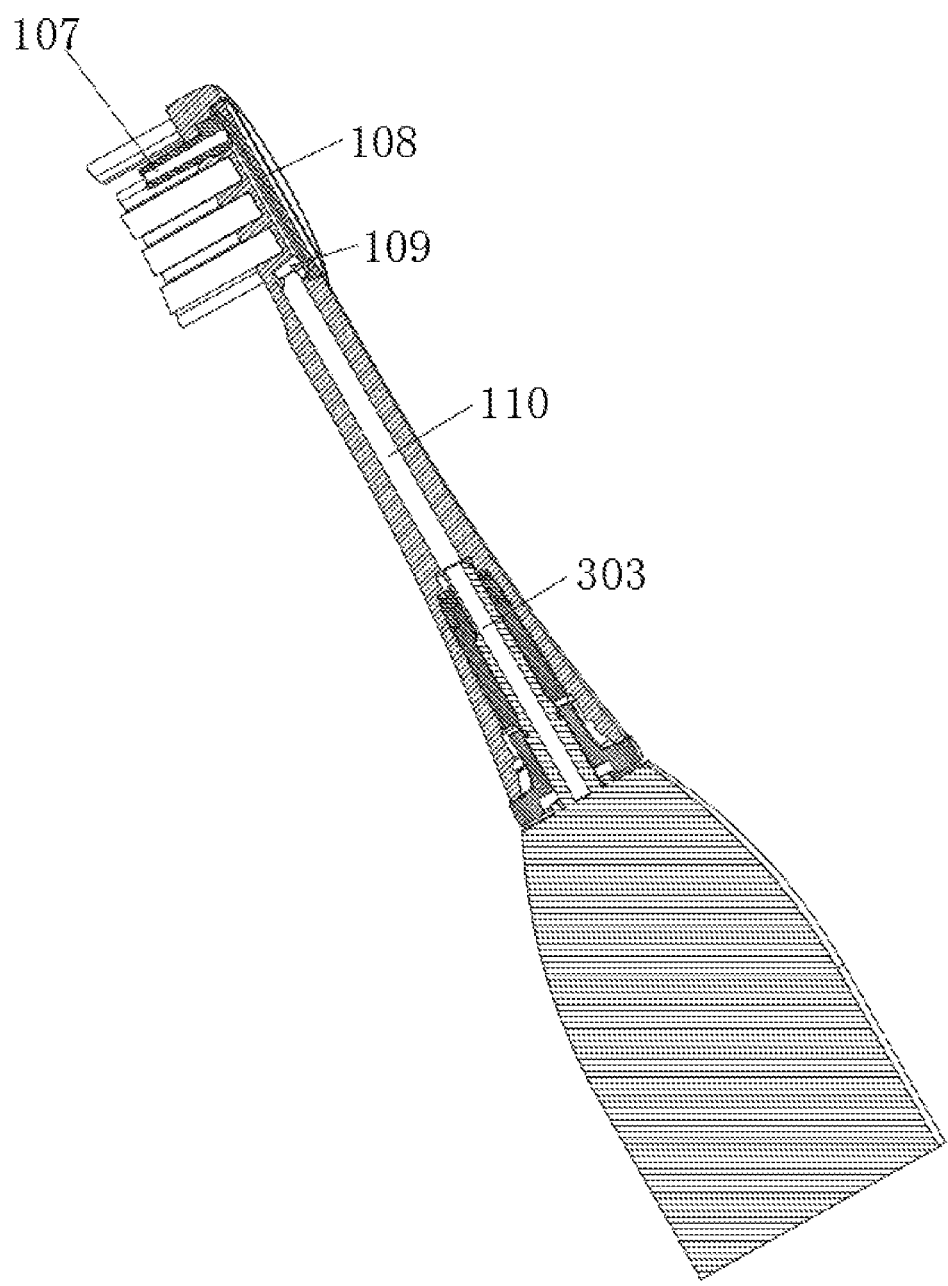
FIG. 3 is a sectional diagram of the electric toothbrush head according to the embodiment of the disclosure.

Reference to FIG. 1, FIG. 2 and FIG. 3, in an embodiment of the disclosure, the dual-purpose electric toothbrush head includes an electric toothbrush head body 1, which includes a toothbrush handle 105 and a toothbrush head 101. The toothbrush head 101 is provided with toothbrush bristles thereon, and is provided with a nozzle 103 and a water trough 108 therein; and the nozzle 103 is connected to the water trough 108. In an illustrated embodiment of the disclosure, an end of the nozzle 103 is connected to the water trough 108, and an opposite end of the nozzle 103 faces towards a direction consistent with the orientation of the toothbrush bristles. The toothbrush handle 105 is provided with a water inlet chamber 110 therein; a water inlet hole 109 is disposed between the water inlet chamber 110 and the water trough 108; and a toothbrush handle tail end 106 of the toothbrush handle 105 is provided with a tail plug 2.

In an illustrated embodiment of the disclosure, the tail plug 2 is used to connect to a main engine 3 of the electric toothbrush; and the main engine 3 is provided with an electrical machine and a pumping motor.

Reference to FIG. 2, in an embodiment of the disclosure, the toothbrush head 101 is provided with a back cover 41 disposed on the water trough 108; the back cover 41 is disposed on a toothbrush head back 4 and is buckled to the water trough 108. In an illustrated embodiment of the disclosure, a shape of the back cover 41 corresponds to a shape of the toothbrush head 101.

Reference to FIG. 2 and FIG. 3, in an illustrated embodiment of the disclosure, a water spray hole 107 is disposed in the nozzle 103, and the water spray hole 107 is connected to the water trough 108.

Reference to FIG. 1, FIG. 2 and FIG. 3, in an embodiment of the disclosure, the toothbrush head 101 is provided with a bristle planting surface 102. In an illustrated embodiment of the disclosure, the bristle planting surface 102 includes 13 holes, each of which is used to mount bristles 104 of the toothbrush bristles; the bristles 104 are important portions used to clean teeth; and the nozzle 103 is disposed in a middle position of the bristle planting surface 102.

In an embodiment of the disclosure, a shape of the nozzle 103 is cylindrical; a diameter of the nozzle 103 is 2 mm; a height of the nozzle 103 is 6 mm; and the nozzle 103 is made of a soft thermoplastic elastomer (TPE) material. In an illustrated embodiment of the disclosure, the toothbrush bristles of the toothbrush head 101 at least includes a first row of toothbrush bristles and a second row of toothbrush bristles; and in other embodiments, the toothbrush head 101 includes multiple rows of toothbrush bristles practically. In an embodiment of the disclosure, the nozzle 103 is disposed between the first row of toothbrush bristles and the second row of toothbrush bristles, and is connected to the water trough 108 through the toothbrush head 101. In an illustrated embodiment of the disclosure, the nozzle 103 and the toothbrush head 101 are connected integrally by double-shot molding, which is stable and fastened. In addition, the nozzle 103 plays a critical role in a function of dental cleaning.

In an embodiment of the disclosure, the main engine 3 pumps the water into the water trough 108 through the water inlet chamber 110 of the toothbrush handle 105, and the water flow out through the nozzle 103 connected to the water trough 108 for scrubbing the oral cavity and the diastema.

In order to facilitate rinsing the diastema or the oral cavity, and to make the nozzle 103 more concentrated and powerful in spraying the water, in an illustrated embodiment of the disclosure, the nozzle 103 includes the water spray hole 107, which is connected to the water trough 108, and is used to spray out the water.

In an embodiment of the disclosure, a diameter of the water spray hole 107 is 1.0 mm, and is connected to the water trough 108 on the toothbrush head back 4; a structure of the water trough 108 is a chamber. In an illustrated embodiment of the disclosure, a length of the water trough is 20 mm; a width of the water trough is 3 mm; a height of the water trough is 1.5 mm; and an area of the water trough is 2 mm$^2$ The water trough 108 is used to flow out the water and direct the water to and spray out from the water spray hole 107, while isolating the water from the holes of the toothbrush head and preventing the water from stringing out of the holes of the toothbrush head.

In an embodiment of the disclosure, the water trough 108 is provided with the back cover 41 thereon. In an illustrated embodiment of the disclosure, the back cover 41 includes ultrasonic wires for the back cover 41 to be fused to the toothbrush head 101 together to form a chamber with the water trough 108, which prevents the water overflowing from the toothbrush head back 4; and the back cover 41 includes a semi-circular structure thereon used to direct the water flowing.

In an embodiment of the disclosure, an end of the water trough 108 that faces towards the toothbrush handle 105 is provided with the water inlet hole 109, which is used to introduce the water from the water inlet chamber 110 of the toothbrush handle 105 into the water trough 108. In an illustrated embodiment of the disclosure, the water inlet hole 109 is designed to incline 10 degrees from a direction of the water, which facilitates the water flowing more smoothly into the water trough 108.

In an embodiment of the disclosure, the toothbrush handle 105 includes the water inlet chamber 110, which is a channel for the water to enter into the water trough 108 from the toothbrush handle tail end 106. In an illustrated embodiment of the disclosure, a diameter of the water inlet chamber 110 is 2.5 mm, a front end of the water inlet chamber 110 is connected to the water inlet hole 109, and the water inlet chamber 110 penetrates the toothbrush handle tail end 106.

In an illustrated embodiment of the disclosure, the toothbrush handle tail end 106 is provided with the tail plug 2, which is used to mount with the main engine 3 and transmit vibration emitted by the main engine 3 to guide the water flow into the water inlet chamber 110.

Figure 4:
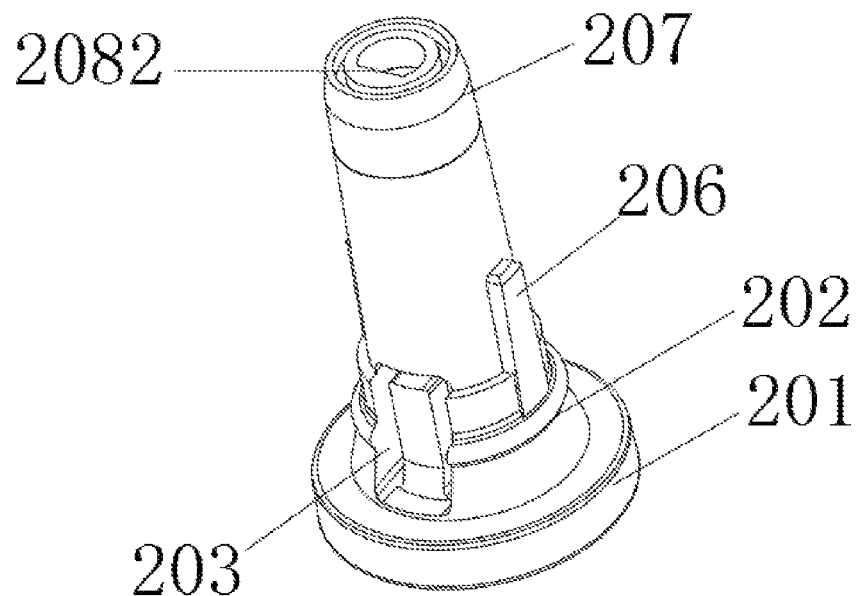
FIG. 4 is a schematic structural diagram of a tail plug of an electric toothbrush head according to an embodiment of the disclosure.
Figure 5:
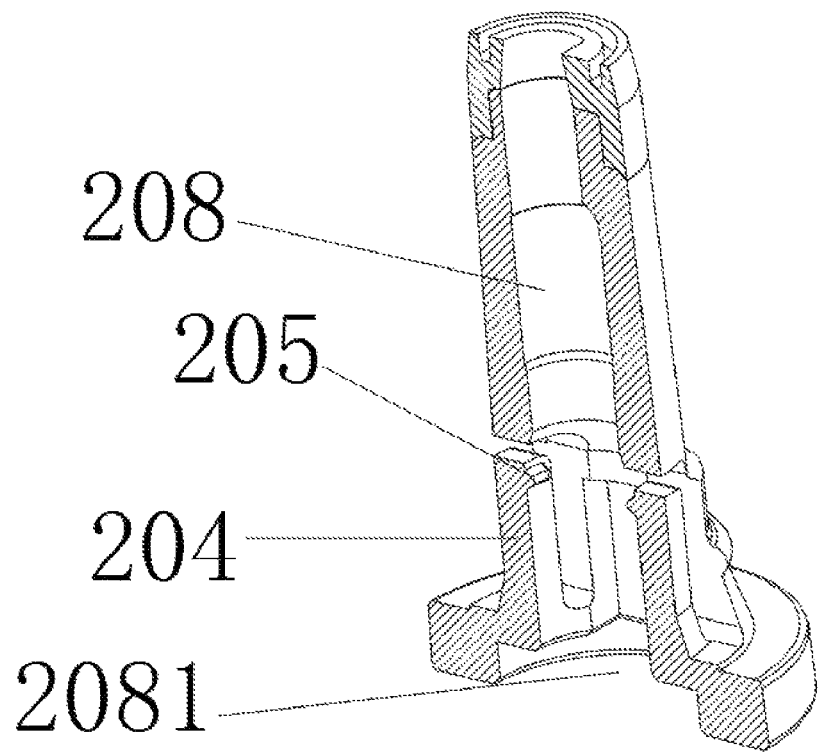
FIG. 5 is a sectional diagram of the tail plug of the electric toothbrush head according to the embodiment of the disclosure.

Reference to FIG. 4 and FIG. 5, in an illustrated embodiment of the disclosure, a shape of the tail plug 2 is a hollow circular table shape, a bottom of the tail plug 2 is provided with a fixing plate 201 thereon, a bottom of the fixing plate 201 is provided with a bottom hole 2801; and a top end of the tail plug 2 is provided with a locating hole 2802.

In an embodiment of the disclosure, the main engine 3 includes a main engine axis 301, which has an axis outlet hole 303 thereon; the main engine axis 301 enters into the tail plug 2 through the bottom hole 2081 firstly, and then penetrates the locating hole 2082 to enter into the water inlet chamber 110.

In an embodiment of the disclosure, the bottom of the tail plug 2 is further provided with a lug boss 202 and a shape of the lug boss 202 is a circular table shape. In an illustrated embodiment of the disclosure, the lug boss 202 is disposed on the fixing plate 201, and the lug boss 202 surrounds an outer side of the tail plug 2.

In an embodiment of the disclosure, the tail plug 2 is provided with at least one locating block 206. In an illustrated embodiment of the disclosure, the tail plug 2 is provided with two locating blocks 206 and each of the two locating blocks 206 is correspondingly provided with a protruding block 205.

In an embodiment of the disclosure, the bottom of the tail plug 2 is provided with at least one opening groove 203. In an illustrated embodiment of the disclosure, the tail plug 2 is provided with two opening grooves 203; and each of the two opening grooves 203 is correspondingly provided with a resilient piece 204.

In an illustrated embodiment of the disclosure, a size of the each of the two opening grooves 203 is larger than that of the each of the two locating blocks 206; and the two locating blocks 206 are correspondingly disposed with the two opening grooves 203.

Reference to FIG. 4 and FIG. 5, in the embodiment, a bottom of the tail plug 2 is provided with the fixing plate 201, the two locating blocks are connected to the fixing plate 201, and the two locating blocks 206 are respectively provided with the two protruding blocks 205; and the protruding blocks 205 are used to fix the tail plug 2 on the toothbrush handle 105.

In an illustrated embodiment of the disclosure, a bottom of the tail plug 2 is provided with the at least one opening groove 203; a size of each the opening groove 203 is 6.9 mm*4.2 mm; and each the opening groove 203 is provided with the resilient piece 204, which is a resilient structure; the resilient piece 204 is provided with a protruding buckle on an inner side thereof, and the protruding buckle is buckled to a buckle slot 302 of the main engine axis 301 to mount the main engine axis 301 fixedly.

In an illustrated embodiment of the disclosure, there are two locating blocks 206; a width of one of the two locating blocks 206 is 0.8 mm and a width of the other one of the two locating blocks 206 is 1.8 mm; the toothbrush handle 105 includes two mounting grooves corresponding to the two locating blocks 206, that is, a size of the mounting groove corresponds to a size of the corresponding locating block 206. Therefore, only when the locating blocks 206 are fitted with the mounting grooves, the tail plug 2 is installed on the toothbrush handle 105, otherwise the installation is rejected. The two locating blocks 206 are used for locating and orientation when installing the tail plug 2, which keeps the bristle planting surface 102 of the toothbrush head 101 facing towards the direction of the main engine 3 straightly.

In an illustrated embodiment of the disclosure, a shape of the tail plug 2 is a hollow circular table shape, and the tail plug 2 forms a tail plug chamber body 208 therein. The tail plug chamber body 208 is used for providing a mounting hole for penetrating the main engine axis 301, which ensures the flexible installation of the main engine axis 301 and no adverse effect on the transmission of the vibration through the main engine axis 301. The tail plug chamber body 208 has a locating flat portion in its front section, corresponding to that of the main engine axis 301, which is used for locating the main engine axis 301.

In an illustrated embodiment of the disclosure, a top of the tail plug 2 is provided with a waterproof portion 207 thereon.

In an illustrated embodiment of the disclosure, the top of the tail plug 2 is provided with the waterproof portion 207, which is made of high density polyethylene (HDPE); and the waterproof portion 207 is provided with a hole thereon, a diameter of which is matched with that of the main engine axis 301. An outside diameter of the hole has an inclined design, which is matched with the inclination of the water inlet hole 109 in the toothbrush handle 105. When the electric toothbrush of the disclosure is assembled, the two projection extension lines of the two inclinations of the waterproof portion 207 and the water inlet hole 109 intersect, such as forming an obtuse angle. Therefore, when the pressure is applied to the high density polyethylene of the waterproof portion 207 during the assembly, an outside sidewall of the high density polyethylene of the waterproof portion 207 is pressed to closely contact to the inner side of the toothbrush handle 105, and the high density polyethylene of the waterproof portion 207 is compressed towards the hole to closely contact to the main engine axis 301, which achieves a purpose of waterproofing.

When the electric toothbrush is in use, the electric toothbrush head body 1 is mounted into the main engine 3, the tail plug 2 is mounted with the main engine axis 301 for locating, and the axis outlet hole 303 on the main engine axis 301 faces straightly towards the water inlet chamber 110 disposed in the toothbrush handle 105.

When the main engine 3 starts working, the main engine 3 vibrates and the main engine axis 301 transmits the vibration to the tail plug 2, then to the toothbrush handle 105, then to the toothbrush head 101, and finally to the bristles 104 to achieve cleaning the teeth.

When the pumping motor in the main engine 3 starts working, the water is sprayed out from the axis outlet hole 303 of the main engine axis 301, into the water inlet chamber 110 disposed in the toothbrush handle 105, through the water inlet hole 109 into the water trough 108, and then sprayed out by the water spray hole 107 disposed in the nozzle 103, so as to achieve cleaning the teeth.

The electric toothbrush head body 1 in the disclosure can be replaced, and is made of the plastic material, which simplifies the original structure, reduces the use of metal resilient pieces. Therefore, the electric toothbrush head of the disclosure is safe, environmental friendly and practical.

The above descriptions are only the exemplary embodiments of the disclosure, but the protection scope of the disclosure is not limited to this. Under the concept of the disclosure, any equivalent structural transformations by using the specification of the disclosure and the attached drawings, or direct/indirect application in other related art shall be included in the scope of the protection of the disclosure.

What is claimed is:

1. An electric toothbrush head, comprising:
    a toothbrush handle and a toothbrush head; wherein the toothbrush head is provided with toothbrush bristles thereon; the toothbrush head is provided with a nozzle and a water trough therein, the nozzle is connected to the water trough; the toothbrush handle is provided with a water inlet chamber therein; a water inlet hole is disposed between the water inlet chamber and the water trough, and the water inlet hole is inclined relative to a length direction of the toothbrush handle and inclined relative to a direction perpendicular to the length direction of the toothbrush handle; the toothbrush handle is provided with a toothbrush handle tail end thereon; and
    a tail plug, disposed on the toothbrush handle tail end; wherein the tail plug comprises:
        a fixing plate;
        a lug boss, disposed around an outer surface of the fixing plate; wherein the fixing plate is provided with an opening groove embedded into the lug boss;
        a tail plug chamber body, disposed on the fixing plate;
        a resilient piece, fixedly connected to the fixing plate and disposed in the opening groove; wherein the resilient piece is provided with a protruding buckle on an inner side thereof, which is configured to be buckled to a buckle slot of a main engine axis of a main engine; and
        locating blocks, fixedly connected to the lug boss; wherein each of the locating blocks is extended from the lug boss to the tail plug chamber body and protruded from the tail plug chamber body, the locating blocks have different widths, and the toothbrush handle is provided with mounting grooves corresponding to the locating blocks with the different widths.

2. The electric toothbrush head according to claim 1, wherein the toothbrush head is provided with a back cover disposed on the water trough.

3. The electric toothbrush head according to claim 2, wherein a shape of the back cover corresponds to a shape of the toothbrush head.

4. The electric toothbrush head according to claim 2, wherein the back cover is provided with ultrasonic wires thereon and the ultrasonic wires are configured for the back cover to be fused to the toothbrush head together to define a chamber with the water trough.

5. The electric toothbrush head according to claim 4, wherein the back cover is further provided with a semi-circular structure thereon and the semi-circular structure is configured to direct flowing water.

6. The electric toothbrush head according to claim 1, wherein a length of the water trough is 20 millimeters (mm); a width of the water trough is 3 mm; a height of the water trough is 1.5 mm; and an area of the water trough is 2 square millimeters (mm$^2$).

7. The electric toothbrush head according to claim 6, wherein the toothbrush bristles of the toothbrush head at least comprise a first row of toothbrush bristles and a second row of toothbrush bristles; and the nozzle is disposed between the first row of toothbrush bristles and the second row of toothbrush bristles.

8. The electric toothbrush head according to claim 7, wherein a shape of the nozzle is cylindrical; a diameter of the nozzle is 2 mm; and a height of the nozzle is 6 mm protruding from the water trough.

9. The electric toothbrush head according to claim 1, wherein the nozzle and the toothbrush head are integrated into one whole by double-shot molding.

10. The electric toothbrush head according to claim 1, wherein the nozzle is provided with a water spray hole therein connected to the water trough.

11. The electric toothbrush head according to claim 1, wherein a bottom of the fixing plate is provided with a bottom hole; and a top of the tail plug is provided with a locating hole thereon.

12. The electric toothbrush head according to claim 1, each of the locating blocks is provided with a protruding block configured to fix the tail plug on the toothbrush handle.

13. The electric toothbrush head according to claim 1, wherein a top of the tail plug is provided with a waterproof portion thereon.

14. The electric toothbrush head according to claim 13, wherein the waterproof portion is disposed on the tail plug chamber body and the waterproof portion is provided with a locating hole therein and a side of the waterproof portion facing away from the tail plug chamber body is provided with a groove surrounding the locating hole.

15. The electric toothbrush head according to claim 14, wherein a cross section of the locating hole is a non-circular shape, including an arc line and a straight line directly connected to two ends of the arc line, and the locating hole is configured to locate the main engine axis of the main engine.

16. The electric toothbrush head according to claim 14, wherein an outside of the waterproof portion is provided with a first plane parallel to the length direction of the toothbrush handle and a second plane inclined relative to the length direction of the toothbrush handle, and the second plane is connected to the first plane.

17. An electric toothbrush head, comprising:
a toothbrush handle and a toothbrush head; wherein the toothbrush head is provided with toothbrush bristles thereon; the toothbrush head is provided with a nozzle and a water trough therein, the nozzle is connected to the water trough; the toothbrush handle is provided with a water inlet chamber therein; a water inlet hole is disposed between the water inlet chamber and the water trough, and the water inlet hole is inclined relative to a length direction of the toothbrush handle and inclined relative to a direction perpendicular to the length direction of the toothbrush handle; the toothbrush handle is provided with a toothbrush handle tail end thereon; and
a tail plug, disposed on the toothbrush handle tail end; wherein a top of the tail plug is provided with a locating hole thereon, a side of the locating hole is provided with a flat plane and another side of the locating hole is provided with an arc plane connected to the flat plane, and the locating hole is configured to match and locate a main engine axis of a main engine by the flat plane and the arc plane.

18. The electric toothbrush head according to claim 17, wherein the tail plug comprises:
a fixing plate;
a lug boss, disposed around an outer surface of the fixing plate;
a tail plug chamber body, disposed on the fixing plate; wherein the fixing plate is provided with an opening groove embedded into the lug boss;
a waterproof portion, disposed on the tail plug chamber body and provided with the locating hole; wherein a side of the waterproof portion facing away from the tail plug chamber body is provided with a groove surrounding the locating hole;
a resilient piece, fixedly connected to the fixing plate and disposed in the opening groove; wherein the resilient piece is provided with a protruding buckle on an inner side thereof, which is configured to be buckled to a buckle slot of the main engine axis of the main engine; and
locating blocks, fixedly connected to the lug boss; wherein each of the locating blocks is extended from the lug boss to the tail plug chamber body and protruded from the tail plug chamber body, the locating blocks have different widths, and the toothbrush handle is provided with mounting grooves corresponding to the locating blocks with the different widths.

19. The electric toothbrush head according to claim 17, wherein the toothbrush head is provided with a back cover disposed on the water trough, the back cover is provided with ultrasonic wires thereon and the ultrasonic wires are configured for the back cover to be fused to the toothbrush head together to define a chamber with the water trough, and the back cover is further provided with a semi-circular structure thereon and the semi-circular structure is configured to direct flowing water.

\* \* \* \* \*